(Model.) 6 Sheets—Sheet 1.

W. GAUSE & J. F. SEIBERLING.
GRAIN BINDER.

No. 257,934. Patented May 16, 1882.

Fig. 1

Witnesses
F. L. Ourand
W. B. Atkinson

Inventor
Wm Gause
J. F. Seiberling
by A. W. Smith & Co.
Attorneys (Model.) 6 Sheets—Sheet 2.

W. GAUSE & J. F. SEIBERLING.
GRAIN BINDER.

No. 257,934. Patented May 16, 1882.

Witnesses
A. L. Ourand
W. B. Atkinson

Inventors
Wm Gause
J. F. Seiberling
by A. M. Smith & Co.
Attorneys (Model.) 6 Sheets—Sheet 5.
W. GAUSE & J. F. SEIBERLING.
GRAIN BINDER.

No. 257,934. Patented May 16, 1882.

(Model.) 6 Sheets—Sheet 6.

W. GAUSE & J. F. SEIBERLING.
GRAIN BINDER.

No. 257,934. Patented May 16, 1882.

UNITED STATES PATENT OFFICE.

WILLIAM GAUSE, OF KOKOMO, INDIANA, AND JOHN F. SEIBERLING, OF AKRON, OHIO, ASSIGNORS, BY DIRECT AND MESNE ASSIGNMENTS, TO SAID SEIBERLING.

GRAIN-BINDER.

SPECIFICATION forming part of Letters Patent No. 257,934, dated May 16, 1882.

Application filed March 10, 1881. (Model.)

*To all whom it may concern:*

Be it known that we, WILLIAM GAUSE, of Kokomo, county of Howard, State of Indiana, and JOHN F. SEIBERLING, of Akron, county of Summit, State of Ohio, have invented certain new and useful Improvements in Grain-Binders, of which the following is a full, clear, and exact description, reference being had to the accompanying drawings, making part of this specification, in which—

Fig. 2 is a front elevation of the same. Figs. 4, 5, 6, 7, 8, 9, 10, 11, and 12 are detail views, hereinafter referred to.

Our invention relates to a novel construction and arrangement of parts in a binding mechanism adapted to take the grain from the inner end of the platform on which the grain falls as it is cut; to the means for compressing the bundle and carrying and tying the band; to the manner of forming the knot relatively to the circle of the bundle; to the manner of timing the movements of the binding mechanism, and the endless apron or mechanism delivering the grain thereto, whereby the delivery of the grain is stopped while the binding mechanism is in action for binding a bundle, and vice versa; and to a novel arrangement whereby the pressure of the grain upon the compressing-fingers is made to throw the binding mechanism into action, and at the same time to throw the mechanism for delivering the grain to the binding mechanism out of action, all as hereinafter explained.

In the accompanying drawings, A represents the main frame, surrounding the drive-wheel B, and having its forward transverse bar, A', extending on the grain side, so as to leave an open space between the grain side of the frame and the adjacent side or inner end of the platform-frame, which is rigidly connected with its outer end, as shown. The platform-frame has no connection with the main frame in rear of the forward transverse bar, A', and consequently an open space, C, is left between said frames for the movement of the binding and compressing arms, hereinafter described, and for the escape of the bound bundle.

Figure 3:
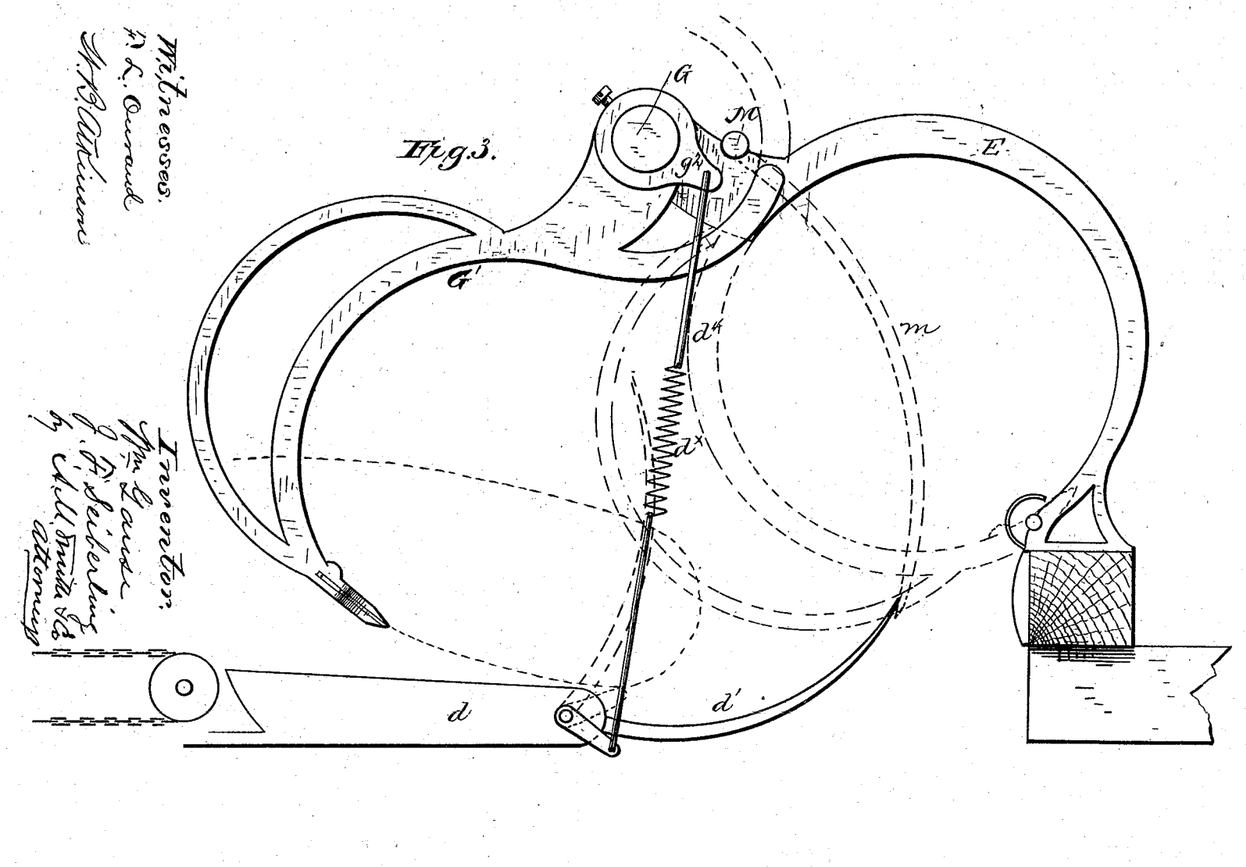
Fig. 3 is a similar view of the compressing and binding devices enlarged.

Within the platform-frame is mounted an endless apron, D, upon which the grain falls, and to which an intermittent movement is imparted, as hereinafter described, for conveying the grain to and discharging it at the inner end of the platform upon an apron composed of stationary fingers $d\, d$, forming an extension of the platform for its reception. In the ends of these fingers is mounted a rock-shaft, $d^2$, provided with fingers $d'\, d'$, which form an extension of the apron $d$ when occupying the horizontal position shown in Fig. 3, but which are folded up into a vertical, or nearly vertical, position (shown in dotted lines) after a bundle has passed over them to the tying devices, for preventing the escape of grain from the platform during the process of binding said bundle.

Figure 1:
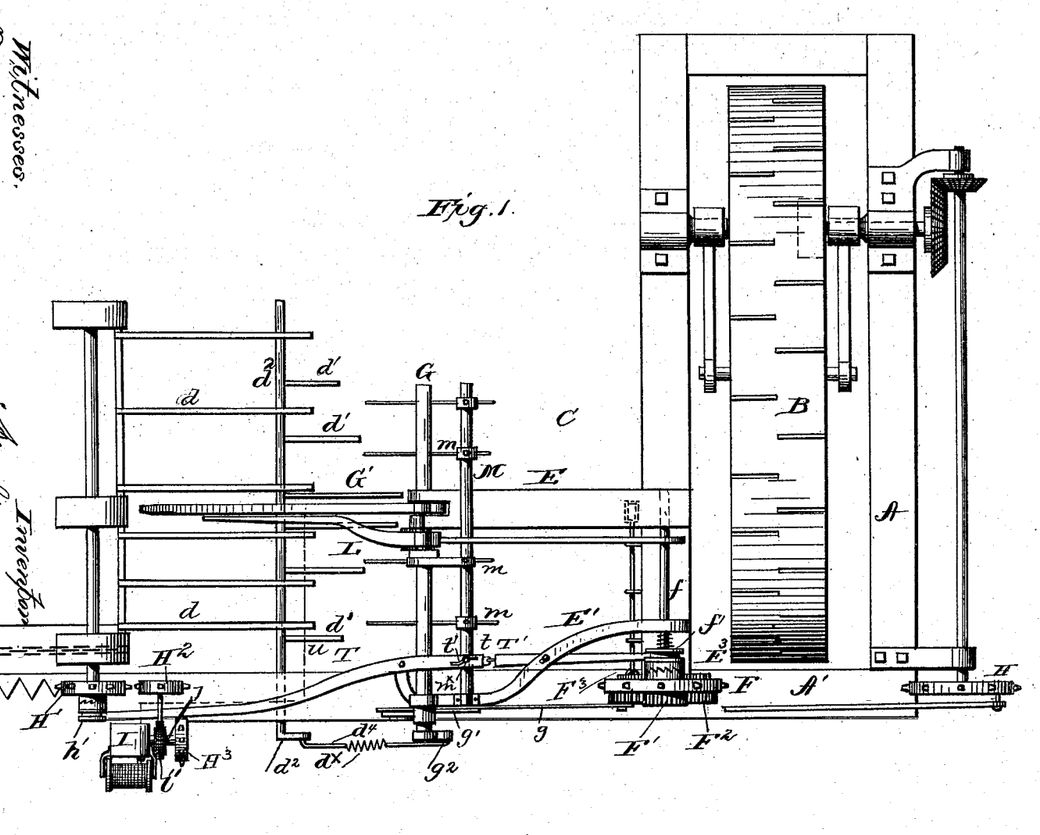
Figure 1 is a plan or top view of so much of a harvesting-machine as is necessary to show our improvements.
Figures 2, 4:
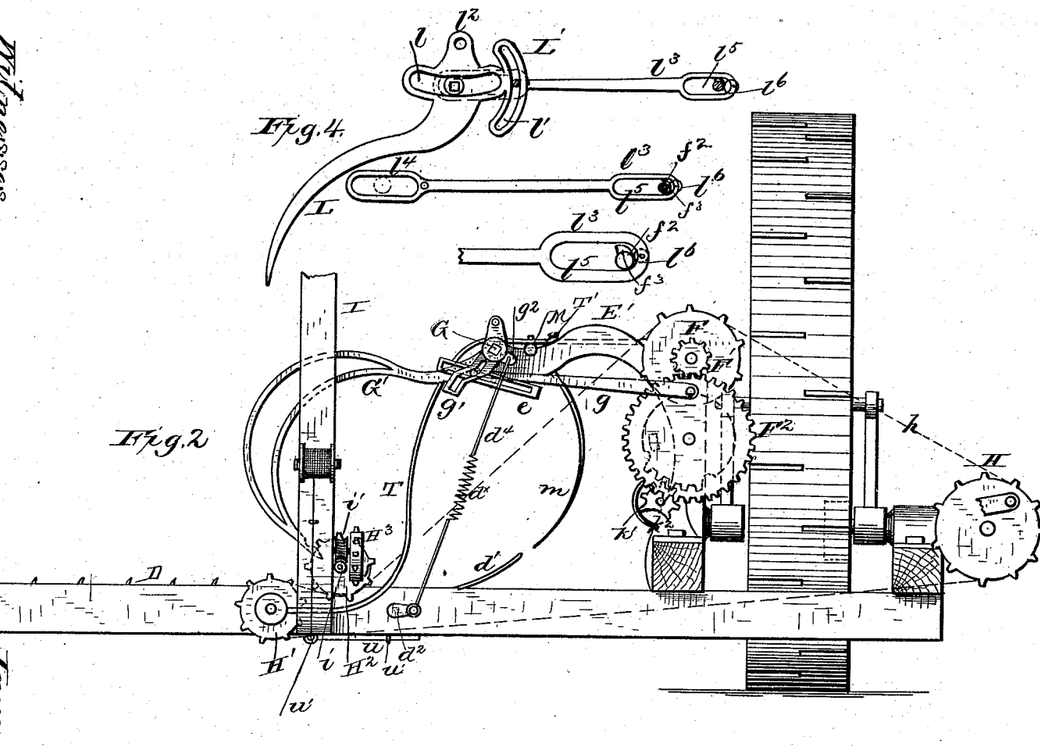

Upon the inner longitudinal frame-bar is secured a curved standard, E, the upper end of which overhangs the open space C, and which, in connection with a forward standard, E', forms the support for the binding mechanism, as follows:

In the overhanging ends of standards E and E' is mounted a longitudinal shaft, G, carrying the needle-arm G'. The forward standard, E', has bearings formed in it for the shafts of the gearing, through which motion is communicated to the binding mechanism, as follows:

F is a sprocket-wheel mounted loosely on a shaft, $f$, which at its forward end has a pinion, F', keyed to it, and in rear of the wheel F is provided with a sliding clutch, $f'$, feathered upon it for engaging the shaft $f$ with the sprocket-wheel F for actuating the binding mechanism. The sprocket-wheel F is driven by means of an endless chain, $h$, from a sprocket-wheel, H, on the forward end of a longitudinal shaft mounted in suitable bearings on the frame outside of the drive-wheel, and to which shaft motion is imparted through bevel-gears connecting it with a transverse pinion-shaft driven from the main drive-wheel, as shown, or in any suitable manner. The sprocket-chain passes also around a sprocket-wheel, H', turning loosely on the forward end of the shaft or roller which drives the platform-apron D, said wheel H' being engaged with its shaft for driving it and the platform-apron by means of a sliding clutch, $h'$, feathered on the shaft in front of the wheel H', which has a corresponding half-clutch on its forward face, as shown in Fig. 1. The chain $h$ also passes under a sprocket-wheel, $H^2$, secured to a short longitudinal shaft, having its bearings in or secured to the reel-post I or other suitable support on the forward platform or frame bar, as shown. The shaft of wheel $H^2$ has on its forward end a worm or screw, $i$, from which motion is imparted to a worm-wheel, $i'$, on a short transverse shaft, $j$, mounted in suitable bearings on the reel-post, and carrying a sprocket-wheel, $H^3$, from which motion is communicated to the reel-shaft. The chain $h$ being always in motion when the machine is at work, it will be seen that the sprocket-wheels F, H', and $H^2$ will also, in connection with the reel driven from the wheel $H^2$, as explained, be in continuous motion; but the wheels F and H' being mounted loosely on their shafts, the raking and binding mechanism connected with the shafts of said wheels will be operated only when their respective shafts are engaged with them, as above explained. The pinion F' engages with and drives a spur-gear, $F^2$, on the forward end of a short shaft secured in the standard E', and provided on its forward face with a crank-wrist, with which a pitman, $g$, is connected, the outer end of said pitman being connected with a slotted crank-arm, $g'$, on the forward end of the rock-shaft G. The standard E' has a slotted plate, $e$, formed upon or secured to its upper end, (shown in Figs. 2 and 8,) through which the pin on the outer end of the pitman $g$ passes into the slotted pendent crank-arm $g'$, and the arm $g'$, as also the longitudinal slot therein, is bent into an angular or ogee form in such manner that the needle and compressing arms connected with said arms are given a quick movement when passing over the apron $d$ $d$ to pick up the bundle, while as it approaches the tying devices, hereinafter described, the pin connecting the rod $g$ with the arm $g'$ recedes from the shaft G and gives the latter part of the throw of the binder-arm a diminishing speed, with a corresponding increase of power required for compressing the bundle. The portion of the slot at the outer end of the crank-arm $g'$ is so arranged that near the end of the throw of the rod $g$ it is brought into a plane parallel with the slot in plate $e$, and the rod $g$ consequently moves for a short distance to complete its inward throw, and starts on its outward throw while the ends of the band are being united without moving the arm $g'$.

On the rear face of the wheel $F^2$ is secured a disk, $F^3$, (shown in Fig. 1, in dotted lines, Fig. 2, and in detail views, Figs. 5 and 7,) provided on one portion of its periphery with a cogged segment at $k$, through which motion is imparted to a pinion, $k'$, on the forward end of the knotter-shaft. This pinion or segment has a portion of its periphery cut away, forming a concavity at $k^2$, conforming to the circle of the periphery of the disk $F^3$, the arrangement of the teeth and smooth surfaces being such that at each revolution of the disk $F^3$ a complete revolution is imparted to the knotter-shaft, after which the smooth surface of the disk moves in contact with the concave portion of the pinion $k'$ and holds the knotter-shaft stationary.

The needle or binder arm shaft G has a second crank-arm, $g^2$, at or near its forward end, from which a connecting-rod, $d^4$, having a spiral spring, $d^\times$, in it at any convenient point, extends to a similar arm on the forward end of rock-shaft $d^2$, carrying the lifting fingers $d'$ $d'$ of the grain-apron or platform-extension, the arrangement being such that as the bundle is carried off from said fingers to be bound the fingers $d'$ are raised to prevent the escape of any grain that may be accumulating to form another bundle, and are again lowered into a horizontal position as the binder-arm moves back into position to take action upon another bundle. The spring $d^\times$ permits the apron to yield to the bundle passing over it.

Upon the rock-shaft G, in front of the needle-arm G', is mounted loosely a compressor-arm, L, (shown in detail view, Fig. 4,) said arm being expanded in width near its upper end and provided with a slot at $l$, through which the shaft G passes, the slot permitting a vibratory movement of arm relatively to said shaft, and above said slot the arm is connected by a shaft passing through a lug or ear, $l^2$, with a similar lug or projection on the heel end of the needle-arm G'. By this arrangement the arm L is carried with the binder-arm, but is permitted a vibratory movement beyond that given to the needle or binder arm. This movement is obtained as follows: The inner end of the expanded part of the arm L, in which the slot $l$ is formed, has a vertical cross-head, L', formed upon it, in which a slot, $l'$, is formed in the arc of a circle having the shaft G as its center, or nearly so as may be owing to the movement of the arm relatively to said shaft. A pitman, $l^3$, having a forked or slotted end, (shown at $l^4$ in Fig. 4,) adapting it to be upheld by and to slide lengthwise on the shaft G, has a wrist-pin entering the slot $l'$, and the opposite end of said pitman is similarly slotted at $l^5$, and has a friction-roller, $l^6$, mounted in it at the outer end of said slot, as shown. The slotted end $l^5$ rests upon a roller, $f^2$, on the rear end of shaft $f$, provided with a cam, $f^3$, which, at each revolution, presses upon the friction-roller $l^6$, crowding the pitman $l^3$ inward. This occurs just as the needle-arm has finished its inward throw and is holding the bundle up to the action of the band-uniting device, at which instant the pin in pitman $l^3$, passing through the slot $l'$ in the compressing-arm L, owing to the movement of said arm with the needle-arm, will be at or near the lower end of said slot $l'$, and the movement of the pitman $l^3$ draws the arm L inward, causing a compression of the bundle beyond what would be due to the needle-arm, thereby giving slack in the band surrounding the bundle while forming the knot therein, as hereinafter described.

A short distance from the needle-arm shaft G the standards E E' have bearings formed in them for another longitudinal shaft, M, having pendent curved fingers $m$, facing the needle, and compressing-arms, above described, and between which and said arms the bundle is grasped and carried to the knotter and held up to the action of the latter. The fingers $m$ are rigidly secured to and move with the shaft M, and the latter has an arm, M', also rigidly secured to it, (see Fig. 6,) provided on one side with laterally-projecting ribs $m'$ $m^2$, forming inclines, which are acted upon by a friction-roller on an arm secured to the needle-arm or to its shaft, as follows: Said arm, or the shaft to which it is rigidly connected, has a heel projection or arm, $G^2$, (see Fig. 6,) in the outer end of which is mounted the friction-roller $g^3$, referred to. This roller, as the bundle is compressed and held up to the knotter, assumes the relation to the cam ledge or rib $m'$ shown in Fig. 6; but at the instant the needle and compressing arms begin their backward throw for releasing the bundle the roller $g^3$ moves under and presses upward upon said ledge, and gives a quick descending movement to the fingers $m$ for forcing the bundle away from the knotter and causing it to drop upon the ground in the open space C. As the roller $g^3$ passes from under the ledge $m'$ it rests upon the cam-ledge $m^2$, and, drawing down upon it, reverses the movement of the fingers $m$, lifting them out of the way until the roller escapes from said ledge, when they resume their normal pendent position, in readiness to assist in grasping and holding another bundle.

Figure 9:
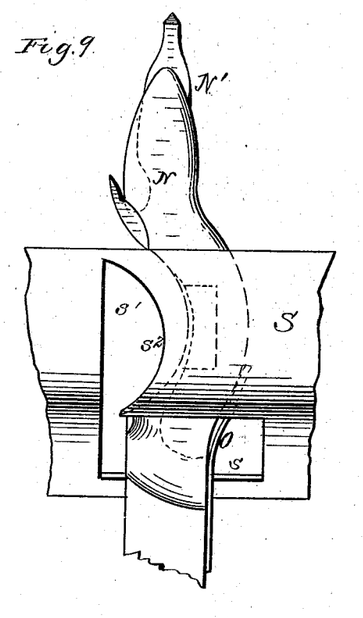
Figure 10:
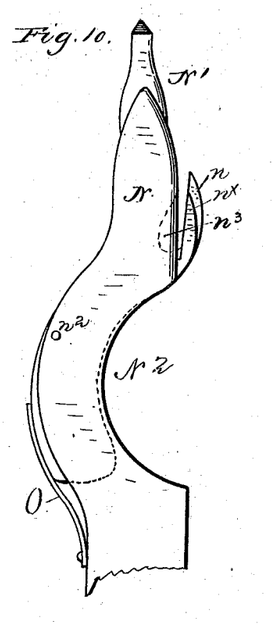
Figure 11:
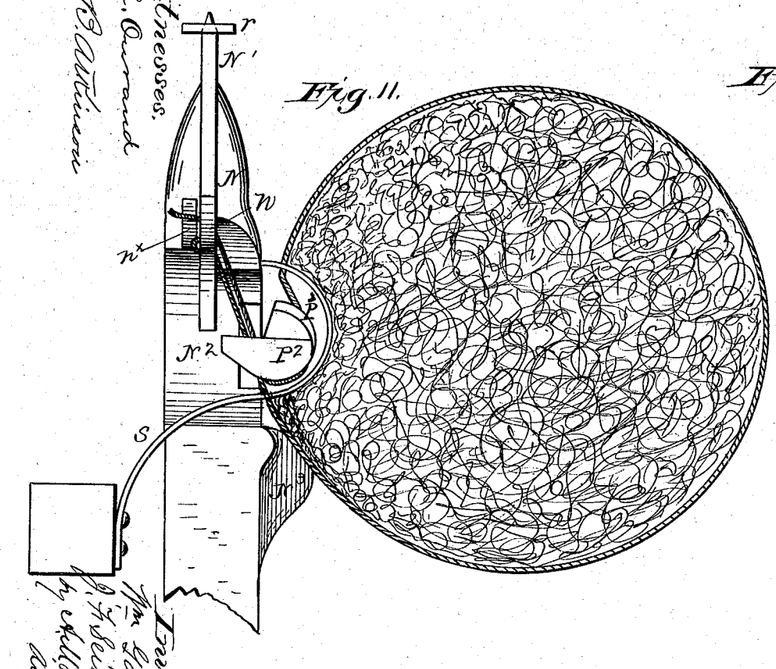
Figure 12:
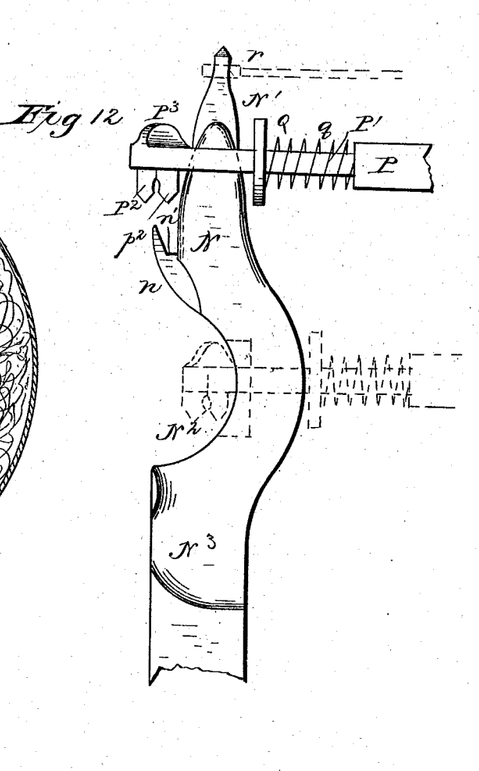

The point N of the binder-arm is represented in Figs. 9, 10, 11, and 12, in which said point is enlarged to show the construction, Figs. 9 and 12 showing the inner face of the needle adjacent to the bundle, Fig. 10 the outer face, and Fig. 11 a rear view of the same. Said arm has a slot in its point extending from front to rear, in which is pivoted the needle or band holder N', provided on its rear edge or face with an inclined outwardly-projecting spur, $n$, between which and the rear face of the point N the ends of the band are grasped and held, as will be explained. This needle has a heel-projection beyond its pivot at $n^2$, upon which a spring, O, rests for holding it against the tension of the band, and just below and back of a shoulder at $n'$, against which the ends of the band are drawn, a concavity, $n^3$, is formed, into which the band is drawn when the ends are to be cut, the forward wall of the slot in the point N, in connection with the adjacent wall of the needle, acting like shear-blades to sever the band when the needle N' is vibrated, as will be explained. Just back of the spur $n$ the point N has a concavo-convex formation given it at $N^2$, the concave side being upon the rear face of the point, the point of the knotter rotating in said concave when forming the knot in the ends of the band, as shown in Fig. 11, and back of said concave, on the inner face of the point, a grooved knob or projection, $N^3$, is formed, which serves to hold the portion of the ends of the band adjacent to the bundle well inward for giving said ends the oblique relation to the face of the point represented in Fig. 11.

Figures 5, 6, 7, 8:
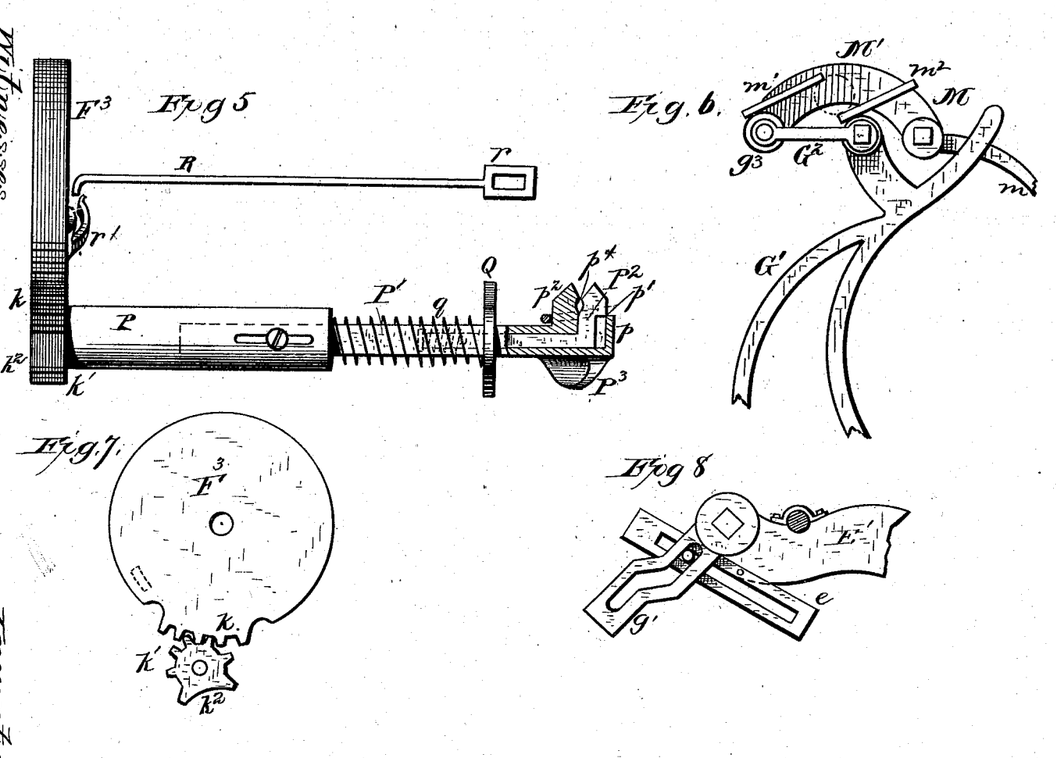

The knotter-shaft P, which is operated by the segment-pinion $k'$, above described, is mounted in suitable bearings in the main frame, and is made in the form of a sleeve, or has a socket formed in its rear end, in which the shank P' of the knotter is free to slide longitudinally, held in place by a pin passing through a longitudinal slot in the sleeve P, or any equivalent device. The shank P' is made in two parts—one in the form of a sleeve having an angular or curved projection, $p$, forming an angular socket in its end, and the other, $P^2$, in L shape, conforming to the shape of the socket in the part P', as shown in Fig. 5. The outer end or face of the angular foot $P^2$ has a shoulder at $p'$, which overhangs the outer wall of the socket in the end of part P', and permits a slight endwise movement of part $P^2$ within and relative to part P', the foot $P^2$ forming the moving jaw of the knotter, the fixed jaw $p^2$ being formed upon the part P' in front of the jaw $P^2$, as shown. These jaws project in the form of spurs at right angles, or nearly so, to the shank or shaft actuating them, and are provided with converging points terminating in a small groove, $p^x$, into which the ends of the band pass after crowding the jaws sufficiently apart to admit them. The jaw $p$ is held up to the jaw $p^2$ by any suitable arrangement of spring for that purpose. The rear face of the shank P', or that opposite the knotter, has a spiral guard or shield, $P^3$, formed upon it, which serves to guide the cord properly to the jaws as the knotter is rotated; and forward of the knotter, leaving sufficient space for the passage of the needle arm or point, the shank P' has a collar, Q, formed upon or rigidly secured to it; and a spring, $q$, interposed between said collar and the rear end of the sleeve-shaft P, serves to hold the sliding shank and knotter thrust outward from the sleeve as far as the stop on the sleeve will permit, so that the point of the needle-arm will pass said knotter in the relative position indicated in full lines, Fig. 12, and in such relation to the ends of the band grasped by the needle as to cause both jaws of the knotter to pass back of said ends. Then, as the convex forward face of the part $N^2$ moves past the collar Q, the latter is crowded forward, drawing the jaws or knotter and the band under the same into the concavity in the rear face of the arm, as shown in dotted lines, Fig. 12. In this position the knotter-shaft is rotated, wrapping the ends of the band on the knotter-shank and bringing the ends of the band this time between the jaws, which, in consequence of the tension of the band upon their diverging points, open to receive them. The needle is now vibrated, by a device which will be described, to cause the ends of the band to pass back to the cutter part at $n^3$ and to cut the same, when the loop slips off over the ends grasped by the jaws, and the knot is formed. At this instant the fingers $m$ are forced downward, as above explained, to withdraw the ends of the band from the jaws of the knotter and cause the discharge of the bundle.

Above the knotter-shaft, in suitable guide-brackets, is arranged a sliding rod, R, (see Fig. 5,) on the rear end of which is a loop, $r$, into which the extreme point of the needle N' enters as the bundle is presented to the knotter. (See Fig. 11.) Just as the knotter completes its revolution, operated through the segment-disk $F^3$, as above described, the rod R is forced backward and again immediately retracted by means of a grooved cam-projection, $r^x$, on the disk $F^3$ acting on a spur formed on the forward end of said rod. By this arrangement the needle is vibrated to permit the passage of the ends of the band to the cutter and retracted for causing the same to be cut, the ends of the band material from the spool being by the same movement grasped between the needle and the rear wall of the slot, in which said needle works, preparatory to passing the band around another bundle. The needle and point of the needle-arm, as they approach the knotter, pass through a slotted or perforated concavo-convex shield, S, covering the knotter, as shown in Fig. 11, the outer convex face of this shield being shown with the needle-arm passing through the slot therein in Fig. 9. Fig. 11 shows the relation of said shield to the compressed bundle, the latter being compressed over the convex face of the shield in such manner as to bring the axial center of the knotter within, or nearly within, the circle of the band surrounding the bundle, as shown. The needle-arm passes through a slot, $s$, and the end of the cord or band coming from the upper side of the bundle is allowed to rest in a transverse slot, $s'$, opening into slot $s$, and having its forward wall, $s^2$, inclining backward to the rear wall for crowding the band backward and assisting the needle-arm in holding it in proper relation to the knotter. By this arrangement, tying the band within the circle which it describes in passing around the bundle, less slack in the band is allowed than where the ends of the band are tied in the ordinary way outside the circle of the bundle, and the bundle consequently retains its compactly-compressed condition.

The point N of the needle-arm has a spur or finger at $n^x$, secured to or formed upon it in rear of the needle N', just outside the concave $N^2$, and lying near about in the same plane as the finger $n$, which serves, as the needle is vibrated, to draw the ends of the band off the shoulder $n'$ and insure their passing into the cutter-concave $n^3$.

The arrangement for throwing the raking mechanism out of action when the binding mechanism is thrown into action, and vice versa, is as follows: The sliding clutches $f'$ and $h'$ on the shafts actuating the binding and raking mechanism have been described. Forks or shipping-levers T T' are employed, the former engaging the clutch $f'$ and the latter the clutch $h'$, as shown. These levers are pivoted in suitable supports on the standard E', and have their adjacent ends coupled together by loops or eyes formed in them, at $t$, near where they cross the finger-shaft M, and in the end of the lever T' overhanging said shaft an oblique cam-slot is formed at $t'$, through which a pin, $m^x$, on the shaft M passes, in such manner that as the shaft M is rocked the pin $m^x$ vibrates the levers T and T'. The arrangement is such that when the grain delivered by the endless apron or other similar acting raking mechanism presses with sufficient force upon the fingers $m$ to rock the shaft M the pin $m^x$, acting on the levers T and T', throws the clutch operated upon by the latter out of engagement and the clutch on the shaft actuating the binding mechanism into engagement, and until the gavel is bound and discharged and the fingers $m$ descend again to their normal position the rake ceases to act. As the fingers fall back to their former position the movement of the clutches is reversed, and the binding mechanism is thrown out of action and the raking mechanism into action.

The band-spool is shown mounted upon a shaft connected with the reel-post; but it may be supported at any suitable point, and the band material (indicated at $u$, Figs. 1 and 2) passes thence through suitable guides, $u'$, as shown, to midway of the apron $d\ d$, where its end is carried up and caught upon the spur $n$ of the needle-arm, as explained. As the grain is delivered by the raking mechanism it crowds the band inward toward the main frame until the binding mechanism is set in motion, as explained, when the needle is carried down under the bundle formed in the band and again seizes the band, where it rises through the guide in the apron upon its finger $n$, and between said finger and the point of the arm, as explained, and the two ends of the band thus surrounding the bundle are carried together up through the slot $s$ in the shield S, as shown in Fig. 11, where they are united, the band severed from the band material from the spool, and the end of the latter again grasped and held by the needle-arm, as above explained.

Having now described our invention, we claim—

1. In a grain-binder, mechanism for removing the grain from the platform and delivering it to the binding devices, in combination with shifting devices for automatically throwing said mechanism out of action when the binding mechanism is thrown into action, and vice versa, whereby said raking and binding mechanisms are made to act alternately, substantially as described.

2. In a grain-binder, mechanism for raking or discharging the grain from the grain-platform and delivering it to the binding devices, in combination with shifting-levers for automatically throwing the binding devices out of action when the needle-arm is raised into position to admit a bundle and simultaneously throwing the raking mechanism into action.

3. The pendent fingers against which the grain is crowded by the action of the raking mechanism, in combination with means for automatically throwing the binding mechanism into action simultaneously with the throwing of the raking mechanism out of action, substantially as described.

4. The alternately and intermittingly operating binding and raking mechanism, operated by means of the endless chain which drives the reel with a continuous motion.

5. The combination, with the needle-arm, of the compressing-arm connected to and moving with said needle-arm, and having a slotted connection with the shaft of said arm, whereby it is adapted to receive a vibratory movement independent of said needle-arm.

6. The compressing-arm L, having a slotted connection with the shaft of the needle-arm, in combination with the slotted link and cam or equivalent devices for imparting a vibratory movement independent of the needle-arm to said compressing-arm.

7. The concavo-convex shield or guard around which the bundle is compressed, in combination with band-uniting devices operating within said shield within the circle of the bundle operated upon, substantially as and for the purpose described.

8. The knotter consisting of the sliding shank having the fixed jaw, in combination with the moving jaw having a longitudinal movement relatively to the shank of the fixed jaw, and adapted to be operated upon by the tension upon the ends of the band.

9. The sliding knotter-shank provided with the hub or collar, in combination with the cam-projection on the needle-arm for giving said shank a longitudinal movement.

10. The rock-shaft carrying the pendent fingers $m$, between which and the needle-arm the grain is grasped and carried to the band-uniting devices, provided with the heel-projection having the cam-ledges, in combination with the friction-roller on the needle-arm shaft, for depressing said fingers and discharging the bound bundle, substantially as described.

11. The needle-arm shaft provided with the slotted angular crank-arm, in combination with the slotted plate $e$, for guiding the pin and giving to the needle and compressing arm a varying speed and power, substantially as and for the purpose set forth.

12. The needle-arm provided with the vibrating needle $N'$, having the band-holding spur $n$, in combination with the spur $n^x$ on the needle-arm for forcing the ends of the band into the cutter when the needle is vibrated.

WILLIAM GAUSE.
J. F. SEIBERLING.

Witnesses:
FRANK A. SEIBERLING,
LUCIUS C. MILES.